(12) United States Patent
Scharpenberg et al.

(10) Patent No.: US 11,498,384 B2
(45) Date of Patent: Nov. 15, 2022

(54) METHOD AND DEVICE FOR OPERATING A PNEUMATIC SYSTEM WITH A COMPRESSED AIR SUPPLY UNIT AND AN AIR SPRING UNIT, PNEUMATIC SYSTEM COMPRISING A COMPRESSED AIR SUPPLY UNIT AND AN AIR SPRING UNIT, AND VEHICLE

(71) Applicant: WABCO GmbH, Hannover (DE)

(72) Inventors: Joerg Scharpenberg, Burgwedel (DE); Matthias Hahn, Barsinghausen (DE); Fatih Oemer Yilmaz, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 390 days.

(21) Appl. No.: 16/955,071

(22) PCT Filed: Sep. 26, 2018

(86) PCT No.: PCT/EP2018/076117
§ 371 (c)(1),
(2) Date: Jun. 18, 2020

(87) PCT Pub. No.: WO2019/120657
PCT Pub. Date: Jun. 27, 2019

(65) Prior Publication Data
US 2020/0391568 A1 Dec. 17, 2020

(30) Foreign Application Priority Data
Dec. 21, 2017 (DE) .................... 10 2017 011 905.8

(51) Int. Cl.
*B60G 17/052* (2006.01)
*B60G 11/27* (2006.01)
*B60G 17/056* (2006.01)

(52) U.S. Cl.
CPC .......... *B60G 17/0523* (2013.01); *B60G 11/27* (2013.01); *B60G 17/0565* (2013.01);
(Continued)

(58) Field of Classification Search
None
See application file for complete search history.

(56) References Cited

U.S. PATENT DOCUMENTS 5,271,632 A * 12/1993 Glaser ...................... B60G 9/02
280/124.112
2007/0241487 A1 10/2007 Ilias
(Continued)

FOREIGN PATENT DOCUMENTS

DE 102005045269 A1 3/2007
DE 102013106041 A1 * 12/2014 ......... B60G 17/0523
(Continued)

*Primary Examiner* — Faye M Fleming
(74) *Attorney, Agent, or Firm* — Leydig, Voit & Mayer, Ltd.

(57) ABSTRACT

A method for operating a pneumatic system having a compressed air supply system and an air spring system includes determining at least one deflection of at least one air spring of the pneumatic system. The air spring is configured to be connected to a gallery in a selectively gas-conveying manner via a valve. The method further includes determining at least one bellows volume of a spring bellows of the at least one air spring based on the at least one determined deflection, indicating a pneumatic surrogate model for the at least one bellows volume and/or for a pressure accumulator volume of a pressure accumulator of the pneumatic system based on a mass flow balance for a balance volume, and calculating, based on the pneumatic surrogate model, at least one pressure value of the at least one bellows volume, the pressure accumulator volume, and/or the balance volume.

20 Claims, 5 Drawing Sheets

(52) U.S. Cl.
CPC .............. *B60G 2202/152* (2013.01); *B60G 2400/51222* (2013.01); *B60G 2400/842* (2013.01); *B60G 2500/30* (2013.01)

(56) References Cited

U.S. PATENT DOCUMENTS

2008/0190170 A1    8/2008  Stiller
2022/0227196 A1 *  7/2022  Meier ................ B60G 17/0155

FOREIGN PATENT DOCUMENTS

| DE | 102015016266 A1 * | 6/2017 | |
| DE | 102004064307 B3 * | 10/2019 | .......... B60G 99/002 |
| EP | 1844961 A1 | 10/2007 | |
| EP | 1744915 B1 | 2/2011 | |
| EP | 2301775 A1 | 3/2011 | |
| JP | 3039209 B2 | 5/2005 | |
| WO | WO 2009054797 A1 | 4/2009 | |

\* cited by examiner

METHOD AND DEVICE FOR OPERATING A PNEUMATIC SYSTEM WITH A COMPRESSED AIR SUPPLY UNIT AND AN AIR SPRING UNIT, PNEUMATIC SYSTEM COMPRISING A COMPRESSED AIR SUPPLY UNIT AND AN AIR SPRING UNIT, AND VEHICLE

CROSS REFERENCE TO RELATED APPLICATIONS

This application is a U.S. National Phase Application under 35 U.S.C. § 371 of International Application No. PCT/EP2018/076117, filed on Sep. 26, 2018, and claims benefit to German Patent Application No. DE 10 2017 011 905.8, filed on Dec. 21, 2017. The International Application was published in German on Jun. 27, 2019 as WO 2019/120657 under PCT Article 21(2).

FIELD

The invention relates to a method for operating a pneumatic system, to a device for controlling and regulating a pneumatic system, to a pneumatic system having a compressed air supply system, and to an air spring system and a vehicle.

BACKGROUND

Methods for operating a pneumatic system, in particular for determining a pressure in a pneumatic system by measurement, are generally known in the art. Particularly in the case of a pneumatic system having a compressed air supply system and an air spring system, it has in the meantime become desirable to reduce the dependence on measurements by pressure sensors, in particular to reduce the outlay on equipment, and to minimize the measuring times during which the functionality of the system is not available, when determining pressure.

A method referred to above is known from EP 1 744 915 B1. Specifically, the method is used when the pressure in the air accumulator is greater than the pressure in the air springs and the through-flow in the throttle return valve and in the air drier lies in the subcritical range. To begin with, a closed control space is then selected within the air supply system, for which purpose the crank casing of the compressor and the air drier is best suited. This control space is brought to a defined pressure level. It is therefore advisable for this control space to be connected to the atmosphere with the help of the 2/2-way valve, so that atmospheric pressure is generated in the control space. This means that the pressure in the control space is known. The 2/2-way valve is then opened for a defined time, so that a volume of compressed air flows from the higher-pressure air springs into the lower pressure control space until the pressure equalizes. In this way, the path covered by the air springs is measured. The load state of the vehicle is inferred from this path. With this load state and the previously determined lowering of the air springs, the pressure in the air springs is concluded by means of a simulation The mean volume flow is then determined by means of the throttle return valve and the air drier, wherein it is assumed that the pressure in the air accumulator is higher than the pressure. The 2/2-way valves are opened for this purpose and for a defined time, so that a volume of compressed air flows from the air accumulator via the air drier into the air springs. In this case, the path covered by the air springs is measured and the volume change is calculated from this. This means that the volume flow from the air accumulator to the air springs is also known. With the pressure determined in the air springs and the mean volume flow and also with the easily determined outside temperature, all differing variables are known so that the pressure in the air accumulator can be calculated, wherein the system-specific constants and a standard temperature and a standard pressure are included in the calculation.

Using the pressure in the air accumulator determined in this way and the known volume in the air accumulator and also using the pressure determined in the air springs and the volume of the air springs calculated over the path covered by said air springs, the compressed air volume of the air supply system is calculated and compared with the compressed air volume tolerance band. When the minimum permitted compressed air volume is exceeded, a corresponding compressed air volume is added to the air supply system, whereas when the maximum permitted compressed air volume is exceeded, a corresponding volume of compressed air is released from the air supply system. In this way, the air supply system once again contains a volume of compressed air which falls within the compressed air volume band for the design case.

To this extent, a method for air volume control in a closed air supply system for a chassis is described, in which the need for, or the surplus of, a required compressed air volume of the air supply system is determined for a design case and added to, or released from, the air supply system over a defined period.

Although an approach such as that in the prior art according to EP 1 744 915 B1 causes a reduction in expenditure, in that the method described there even dispenses entirely with a pressure sensor, a number of inadequacies have still been demonstrated. The concept is above all still capable of improvement in relation to the reliability of a possibly only approximately calculated pressure value. The vehicle lowering and lifting processes required in order to calculate the pressure are also relatively inefficient, since the functionality of the level regulation is not available during this time and since the measuring processes lead to a pressure loss. The lowering and lifting processes also result in a change in the vehicle level.

SUMMARY

In an embodiment, the present invention provides a method for operating a pneumatic system having a compressed air supply system and an air spring system. The method includes determining at least one deflection of at least one air spring of the pneumatic system, wherein the air spring is configured to be connected to a gallery of the pneumatic system in a selectively gas-conveying manner via a valve in a valve block. The method further includes determining at least one bellows volume of a spring bellows of the at least one air spring based on the at least one determined deflection, indicating a pneumatic surrogate model for the at least one bellows volume and/or for a pressure accumulator volume of a pressure accumulator of the pneumatic system based on a mass flow balance for a balance volume, and calculating, based on the pneumatic surrogate model, at least one pressure value of the at least one bellows volume, the pressure accumulator volume, and/or the balance volume.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
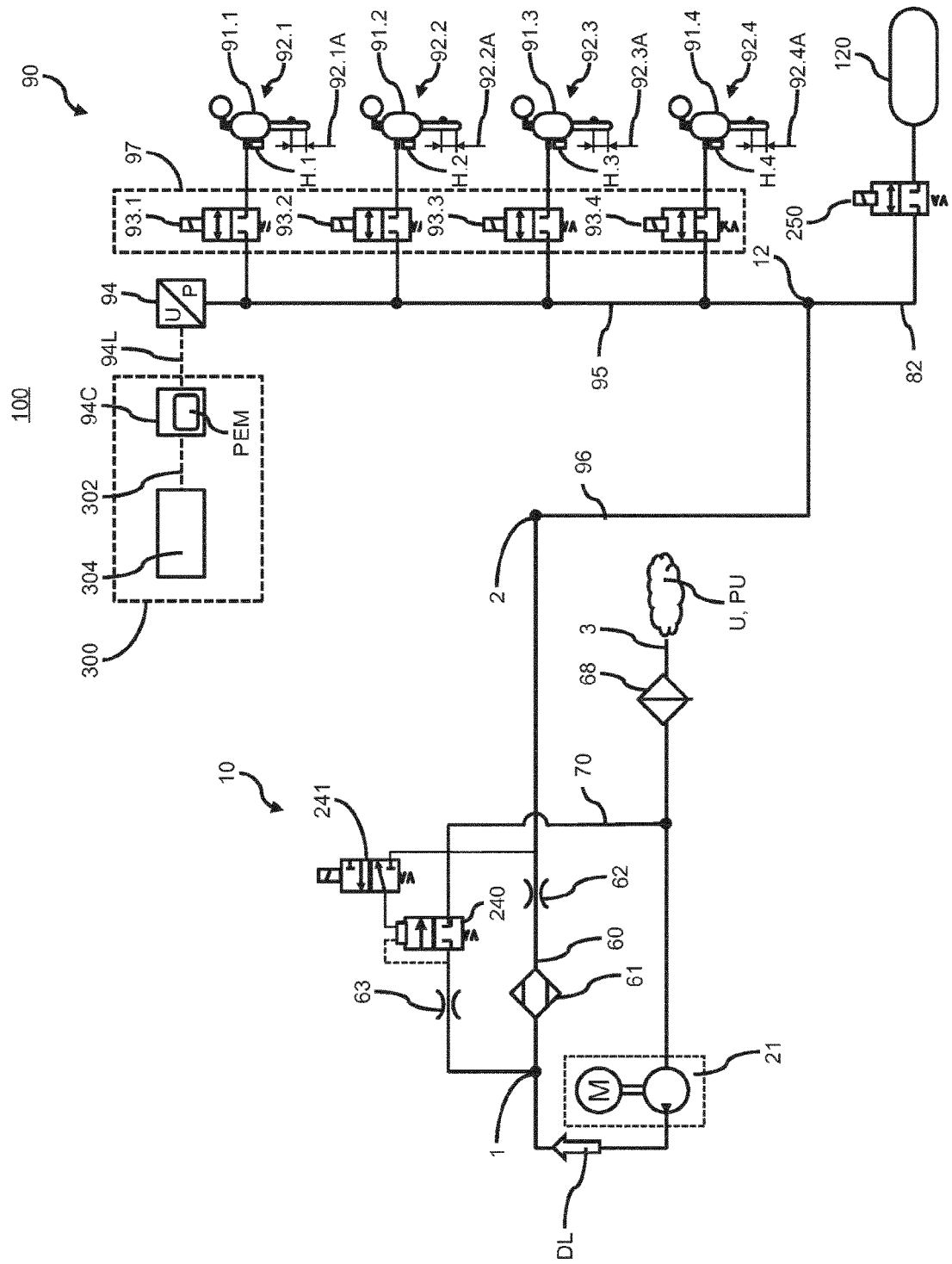
FIG. 1 shows a preferred embodiment of a pneumatic system with a compressed air supply system and an air spring system.

It is desirable for a method, a device for controlling and regulating a pneumatic system, and a pneumatic system with a compressed air supply system and an air spring system to be specified which offer an improvement in terms of the reliability of the pressure determination and efficiency, particularly in relation to system availability.

The present disclosure specifies an improved method in the above regard and a pneumatic system having a compressed air supply system and an air spring system, wherein the pressure in the pneumatic system is determined reliably and efficiently. In particular, the dependence on sensor-based measurements can be reduced.

The disclosure considers that it is generally advantageous for the number of sensors required for pressure determination to be reduced, in particular in order to save costs and reduce expenditure on equipment.

The disclosure further considers that, on the other hand, a reduction in the number of pressure sensors, in particular to one pressure sensor, can lead to different pressure measurements taking place one after the other through the sequential addition of the components being measured and this can be associated with disadvantages.

The disclosure provides a method for operating a pneumatic system having a compressed air supply system and an air spring system, wherein the pneumatic system comprises: a pressure accumulator with a pressure accumulator volume, and/or an air drier with an air drier volume, a gallery and at least one air spring that can be connected to the gallery in a selectively gas-conveying manner via a valve in a valve block, having a number of bellows volumes which are assigned to the air springs.

The disclosure considers that the sequential pressure measurement of all components, such as spring bellows and pressure accumulators, for example, leads to a longer measurement duration. The system functionality is not available during this measurement duration. A limitation of the system availability of this kind is noticeable to the user, in particular to the driver of a vehicle, when the measurement takes place between the changeover of a component. A measurement at this point in time particularly takes place in order to minimize the air loss and therefore the pressure loss which would otherwise result due to the sequential addition of the components. A measurement of this kind lasting several seconds takes place between the lifting of the rear axle and the lifting of the front axle, for example, and is noticeable to the driver.

The disclosure further considers that a sequential pressure measurement results in valves of the pneumatic system having to be designed for a substantially larger number of switching operations, on account of the addition of each component for each measurement. This leads to a corresponding design engineering in structural work and, in particular, costs. An addition of all components to be measured leads to a pressure loss which, on the one hand, can lead to an unwanted level loss of the vehicle and, on the other, must be compensated through corresponding additional work, in particular by the compressor. The disclosure further recognizes in relation to the prior art referred to above that through parasitic volumes of the air drier and the lines, in particular, there can be an unwanted overflow during pressure measurement. This is the case, for example when the vehicle is raised by means of compressed air from the pressure accumulator and a higher pressure therefore prevails in the air drier than in a component to be measured subsequently. In this case, air flows from the parasitic volume into the component being measured and leads to an unwanted level change.

Embodiments disclosed herein advantageously offer, by comparison with the prior art mentioned above (i.e. advantageously by comparison with an exclusive pressure measurement and also advantageously by comparison with an exclusive, purely computational pressure calculation), the basis for an improved pressure measurement by which the aforementioned problems are partially or completely eliminated.

A method according to an embodiment further comprises the following steps: determining at least one deflection of the at least one air spring, determining at least one bellows volume of a spring bellows of the at least one air spring based on the at least one deflection.

A method according an embodiment therefore further comprises the following steps: indicating a pneumatic surrogate model for the volumes based on a mass flow balance for a balance volume, calculating at least one pressure value of a volume based on the pneumatic surrogate model.

In particular, the dependence on measurements, in particular sequential measurements, by sensors is reduced through the, on the one hand, computational determination of the pressure based on a pneumatic surrogate model and, on the other hand, by taking account of the valve switching operations performed in order to control the air spring system. Furthermore, the calculation of the pressure during each switch or control operation of the pneumatic system leads to a current pressure value not only being available at the time of a measurement in each case, but—at least in approximated form—for each change in state, in particular for each switching or control operation of the pneumatic system.

In particular—and this is against the background of the problems described above—the number of measurements can be reduced, or measurements can even be dispensed with entirely, by determining the pressure through calculation. In this way, the system availability of the air spring system is therefore also increased. Furthermore, the number of switching operations required in the valves of the pneumatic system is thereby reduced and a simplification of the design engineering work or a reduction in the cost of the valves is therefore achieved. The air loss caused by measurements and the compensation work required as a result of this, in particular of the compressor, is thereby avoided. Finally, the reduction in measurements, or the absence of measurements, means that an overflow of compressed air from parasitic volumes is reduced or avoided entirely.

Embodiments disclosed herein enable a measurement of the air pressure actually prevailing in the gallery to take place at a time when the pneumatic system, in particular the air spring system, is not required. Based on the measuring result, an adjustment of the pressure determined based on the pneumatic surrogate model can then take place. In this way, the availability of the air spring system is not compromised.

In a synergistic way, a continuously updated determination of the pressure is made possible without the disadvantages of an actual, in particular sequential, measurement. This is because the computational determination of the pressures means that information which is already available, in particular on the load state of the vehicle and on the spring bellows—such as the current deflection of the associated air spring and therefore the contour of the spring bellow—can be advantageously used.

It is particularly provided that the at least one pressure value is calculated during a change in state of the pneumatic system, wherein the change in state is a change in the at least one deflection or one control operation of the air spring system or a switching operation of at least one valve. A change in state may, for example, be caused by a change in the load state of the vehicle; for example when a passenger climbs in, the vehicle height lowers due to the additional weight and, as a result, the at least one deflection of an air spring changes. Irrespective of this, a change in state can also be caused by the change in other environmental and operating parameters such as, for example, a changing atmospheric pressure or a changing ambient temperature.

The control system of an air suspension system requires the pressures in the air spring bellows and in the pressure accumulator for a variety of purposes, for example the availability calculation during lifting from a pressure accumulator. The pressures in the air spring bellows, in particular, are primarily dependent on the static wheel load (vehicle unladen weight plus variable vehicle load) and the contour of the spring bellows. Through the detection of all parameters describing the state of the pneumatic system, in particular by sensors fitted in the pneumatic system and in the vehicle, a regular, in particular continuous or quasi-continuous, detection of changes in state can take place. Suitable sensors for this purpose are, in particular, level sensors, temperature sensors, and/or pressure sensors.

Switching operations of the pneumatic system, in particular switching operations in the form of valve switching which are automatically performed in the context of control operations of the pneumatic system, but also manually triggered switching operations, represent changes in the state of the pneumatic system. Through the practically continuous detection of relevant changes in state of the pneumatic system, in a development of this kind the calculation of the pressure value determined by means of the pneumatic surrogate model can be kept constantly up-to-date. The pressure value determined computationally thereby advantageously corresponds as closely as possible to the pressure value actually prevailing.

It is advantageously provided that the at least one pressure value is corrected by means of a pressure value measured by a pressure sensor. In concrete terms, this may involve the pressure value determined computationally being compared with a value determined by measurement for the purposes of correction. In particular, the pressure value determined computationally may be replaced by the pressure value determined by measurement at regular or irregular intervals.

In a development of this kind, an advantageous compromise is reached between a constantly up-to-date pressure value determined computationally and describing the state of the pneumatic system at least approximately and a pressure value determined by measurement which, although determined at relatively large intervals of time, is precise.

In particular, it is provided that the measured pressure value is measured by means of the pressure sensor in a period of time in which no control operation of the air spring system takes place. This may specifically involve the pressure actually prevailing in the total volume being determined by sensors using a pressure sensor, in particular in order to undertake an adjustment of the pressure variable determined computationally, in particular on the basis of the pneumatic surrogate model. In a development of this kind, the measurement takes place, in particular, in a period of time in which the functionality of the compressed air supply system is not required. This means that within this period of time no vehicle lifting or lowering operations, in particular, need be carried out. A development of this kind advantageously facilitates a temporal disconnect between the measurement of a compressed air value and the provision or computational determination of a pressure value based on the pneumatic surrogate model. For operations, in particular control operations of the air spring system, for which a current value of the pressure prevailing in the total volume is required, instead of a measured pressure, a computationally determined pressure can be used and a measurement can thereby be advantageously avoided.

This advantageously leads to the disadvantage referred to above, whereby the availability of the compressed air supply system is limited by a measurement of a compressed air value, in particular a sequential measurement of multiple compressed air values, being mitigated or even avoided completely.

In particular, it is provided that the measured pressure value is measured by means of the pressure sensor during a control operation. This may specifically mean that—unlike in the case of a measurement triggered expressly for the purpose of correcting the computationally determined pressure value—in this case a measurement which would advantageously take place anyway, in particular a pressure measurement conducted within the framework of a control operation of the pneumatic system, can be used to determine the actual pressure and thereby correct the pressure value determined computationally. A measurement of this kind may, for example, take place during the lifting of the vehicle by the compressor or during the filling of the pressure accumulator.

It is advantageously provided that the at least one deflection is measured by means of a level sensor. In this case, an existing sensor is particularly advantageously used which serves, in particular, to determine the vehicle height at the respective air spring, in order to determine the deflection of the air spring and therefore to determine the bellows volume.

It is advantageously provided that the pneumatic surrogate model is created by the steps: determining an initial pressure prevailing in the balance volume, determining at least one individual initial pressure in at least one individual volume which is not part of the balance volume, determining all air mass flows flowing into the balance volume or flowing out of the balance volume, determining a total air mass located in the balance volume and/or determining at least one individual air mass located in a volume, calculating the pressure with an air mass, a volume and a measured temperature based on a gas equation, in particular an ideal gas equation. This specifically involves the formation of the pneumatic surrogate model taking place through a balancing of all air mass flows entering and leaving the balance volume, wherein the volume of the balance volume is known or determinable and the pressure prevailing in the balance volume can therefore be determined based on a gas equation, in particular an ideal gas equation. For this purpose, the temperature, in particular the temperature prevailing in the balance volume, is measured or determined in some other way, in particular approximately. In this way, the determination of the pressure prevailing in the balance volume is advantageously facilitated. Moreover, it should be pointed out that the designation "creation of the surrogate model" should equally be understood to mean the use of the surrogate model or the updating of the input variables of the equations of the model. The fundamental relationships are not therefore newly created for each computational determination of the pressure, but only parameters describing the state, in particular the deflection of the air springs to describe the balance volume, are updated.

Within the framework of a particularly preferred development it is provided that the determination of all air mass flows flowing into the balance volume or out of the balance volume further involves the following steps: determining through calculation at least one bellows air mass flow by means of a diaphragm equation, taking account of at least one spring bellows pressure and at least one actual spring bellows flow cross section, and/or determining through calculation at least one accumulator air mass flow by means of a diaphragm equation, taking account of at least one accumulator pressure and at least one actual accumulator flow cross section, and/or determining by calculation a supply air mass flow by means of a diaphragm equation, taking account of at least one air drier pressure and at least one actual supply flow cross section, balancing a total air mass, taking account of all air mass flows.

This specifically involves, in particular, for the purpose of balancing, all air mass flows flowing into and out of the balance volume being balanced. This need not necessarily mean that during each balancing an air mass flow inevitably takes place at each throttle or at each point described in the pneumatic surrogate model by a diaphragm equation. Instead, it is possible, or even advisable, to perform a balancing and therefore a recalculation of the pressure after each switching operation of a valve, in order to update the pneumatic surrogate model and to keep the computational pressure value constantly in a state corresponding as closely as possible to the actual pressure. Through the computational determination of the mass flows and the computational determination of the pressure based on this, particularly permanently with the help of the current level values and the air mass in the respective volume, dependence on sensors is advantageously reduced. This relates, in particular, to a time dependency of a pressure measurement. A particularly preferred exemplary embodiment of a computational determination of the mass flows and of the subsequent computational determination of the pressure is explained as an exemplary system of diaphragm equations in the description of the figures.

It is particularly provided that determining the air drier pressure further comprises the steps: determining through calculation a compressor air mass flow by means of a diaphragm equation, taking account of at least one compressor pressure and at least one actual compressor flow cross section, determining through calculation a vent air mass flow by means of a diaphragm equation, taking account of at least one vent pressure and at least one actual vent flow cross section. In concrete terms, this may involve both the compressor, as the input, and the vent connection, as the output, of the balance volume acting as the control volume being combined as a supply for the purpose of simplification in the pneumatic surrogate model, in particular within the framework of a further mass flow balance. In this way, the pressure calculation based on the pneumatic surrogate model is advantageously simplified.

It is advantageously provided that the initial pressure prevailing in the balance volume is determined based on the measured pressure. This specifically involves a measured pressure being used as an input variable for the computational determination of the pressure by means of the pneumatic surrogate model. The advantage of this is that this value could be determined in a period of time prior to the calculation, particularly while the compressed air supply system remained functional. The computational determination of the current pressure value can also be carried out based on the most up-to-date value possible, which particularly exhibits a low deviation from the pressure actually prevailing in the balance volume and/or an individual volume.

It is provided within the framework of a particularly preferred development that the initial pressure prevailing in the balance volume is determined based on the calculated pressure of a preceding application cycle of the pneumatic surrogate model. This specifically involves a value being used as the input variable for the computational determination of the pressure, which value has likewise been determined computationally, namely particularly in a preceding application of the pneumatic surrogate model. In this way, the fact that possible deviations from the pressure actually prevailing in the balance volume accumulate over the course of one or more preceding calculations can be tolerated. However, this risk can be mitigated or managed through the quality of the pneumatic surrogate model, by taking account of systemic deviations of the model from reality through adjustment factors and, in particular, by measuring the pressure actually prevailing in the balance volume for the purposes of correction. In this way, dependence on a sensor measurement is advantageously reduced.

It is particularly provided that the compressor pressure and/or the compressor air mass flow is determined by a delivery flow characteristic curve. This means, specifically, that by means of a known correlation which is described in the form of a delivery characteristic curve, the delivery capacity of the compressor, in particular a volume flow depending on a pressure, can be determined. On this basis, in an advantageously simple manner, the air mass flow delivered by the compressor can be determined during the balancing of the total air mass.

Within the framework of a particularly preferred development, it is provided that the delivery flow characteristic curve is adapted depending on environmental parameters, in particular an atmospheric ambient pressure and/or a compressor supply voltage. This means, in concrete terms, that the correlation between the volume flow and pressure described in the delivery flow characteristic curve is adjusted as a function of environmental parameters influencing the compressor. This happens, in particular, in order to take account of the performance of the compressor, which is influenced by the changed environmental parameters, when determining the air mass flows. In this way, the result of the calculation is advantageously improved, particularly in that it corresponds more closely to reality.

Within the framework of a particularly preferred development, it is provided that the vent pressure is provided by the atmospheric ambient pressure. This specifically means that when applying the pneumatic surrogate model and, in particular, when determining the vent air mass flow during application of the diaphragm equation, the ambient pressure, in particular the air pressure prevailing outside the vehicle, is used. This value may be measured by a further sensor, for example, which does not necessarily belong to the compressed air supply system, or it may be determined, in particular approximated, based on other measurements and information such as, for example, the current geographical altitude of the vehicle.

In particular, it is provided that compressed air is generated by a compressor if the determined pressure or the measured pressure lies below a minimum pressure value. This means in concrete terms that a pressure value is determined computationally, in particular, and/or from a combination of calculations and measurements, and measures are taken to increase the pressure when a critical minimal value is not reached based on the determined value in terms of a control loop. A measure of this kind is, in particular, the generation of compressed air to fill a pressure accumulator, in order to supply an adequate volume of compressed air to carry out the anticipated level control processes of the air spring system. In this way, the availability and reliability of the pneumatic system and, in particular, the compressed air supply system is advantageously improved.

It is advantageously provided that compressed air is released via a vent connection if the determined pressure or the measured pressure lies above the maximum pressure value. Analogously to the development described above, this means in concrete terms that a pressure value is determined particularly computationally and/or from a combination of calculations and measurements and measures for reducing the pressure are carried out based on the determined value within the meaning of a control loop when a critical minimal value is not reached. A measure of this kind is, in particular, the discharge of compressed air via a vent connection. In this way, critical pressure states which can be caused by an over-critical air pressure within the balance volume are advantageously avoided.

The disclosure further provides a device for the control and regulation of a pneumatic system with a pressure determination unit and a pressure regulator for implementing a method as described above. The disclosure further provides a pneumatic system with a compressed air supply system and an air spring system designed for implementing a method as described above, wherein the pneumatic system comprises: a pressure accumulator, a gallery and at least one air spring that can be connected to the gallery via a valve of a valve block in a selectively gas-conveying manner, a device for the control and regulation of the pneumatic system.

The disclosure further provides a vehicle, in particular an automobile, having a pneumatic system and a device for controlling and regulating the pneumatic system with a pressure determination unit and a pressure regulator for implementing a method as described above.

A device for the control and regulation of a pneumatic system having a pressure determination unit and a pressure regulator is designed for implementing a method as described above. In the case of a device for the control and regulation of a pneumatic system, the advantages of the method are advantageously utilized. This is particularly achieved by the pressure determination unit which performs a pressure determination based on the pneumatic surrogate model and thereby facilitates a pressure determination and pressure regulation with the advantages already indicated in connection with the method.

According to the disclosure, a pneumatic system is configured with a compressed air supply system and an air spring system for implementing the method, wherein the pneumatic system comprises: a pressure accumulator, in particular a pressure accumulator in the compressed air supply system and/or a pressure accumulator in the air spring system, a gallery and at least one air spring that can be connected to the gallery via a valve of a valve block in a selectively gas-conveying manner, a device for controlling and regulating the pneumatic system.

The pneumatic system also uses the advantages of the method in an advantageous manner. Through pressure determination based on the pneumatic surrogate model, it allows a pressure determination and pressure regulation with the advantages already indicated in connection with the method. This is advantageous, particularly in the case of automobiles, since a computational determination means that the dependence on sensor measurements can be reduced and therefore measurements which particularly lead to waiting times that are noticeable to the vehicle user can be reduced or avoided.

FIG. 1 shows a preferred embodiment of a pneumatic system 100 with a compressed air supply system 10 and an air spring system 90. The compressed air supply system 10 has a compressed air supply 1, a compressed air connection 2 to the air spring system 90 and a vent connection 3 to the environment U, in which an atmospheric ambient pressure PU prevails. In addition, the compressed air supply system 10 comprises a pneumatic main line 60 between the compressed air supply 1 and the compressed air connection 2. The pneumatic main line 60 has an air drier 61 and a first throttle 62. A vent line 70 of the compressed air supply system 10 connects the compressed air supply 1 via a second throttle 63 and a vent valve 240 to the vent connection 3. A gallery main connection 12 of the air spring system 90 is connected to the compressed air connection 2 via a supply line 96.

Furthermore, a control valve 241 is connected to the vent valve 240 in such a manner that with the control valve 241 in a corresponding position, the compressed air located in the pneumatic main line 60 can be used to adjust the vent valve. In this case, the first throttle 62 ensures that a sufficiently high dynamic pressure always forms upstream of the first throttle 62 to open the valve 240. In this way, said valve can be moved from the blocked position shown into a regeneration position in which air can flow from the compressed air supply 1 via the vent line 70 to the vent connection 3. In this way, the air drier 61 can be flowed through for the purpose of regeneration by means of compressed air from the pressure accumulator against the actual delivery direction.

As can clearly be seen on the right side in FIG. 1, an air spring system 90 of a vehicle is supplied. The air spring system 90 has a gallery 95 to which a bellows branch line is connected, pneumatically separable by a directional valve 93.1, 93.2, 93.3, 93.4 in each case, which bellows branch line leads in each case to a bellows 91.1, 91.2, 91.3, 91.4 of an air spring 92.1, 92.2, 92.3, 92.4. In the present case, a totality of four directional valves 93.1, 93.2, 93.3, 93.4 is arranged in a valve block 97. Depending on the pressure or volume of air located in the bellows 91.1, 91.2, 91.3, 91.4, the air spring 92.1, 92.2, 92.3, 92.4 is deflected by a deflection 92A, 92.1A, 92.2A, 92.3A, 92.4A. A pressure sensor 94 is connected to the gallery 95. In the present case, the pressure sensor 94 is with a sensor line 94L with a pressure determination unit 94C which can calculate a pressure P on the basis of a pneumatic surrogate model PEM. By means of the sensor line 94L, a measured pressure value PMESS, in particular, can be transmitted from the pressure sensor 94 to the pressure determination unit 94C for the purpose of correction. The pressure determination unit 94C is furthermore assigned to a device 300 for the control and regulation of the pneumatic system 100. In this case, it is connected to a pressure regulator 304 via a control line 302 in a signal-conducting manner. The pressure determination unit 94C can therefore be regarded in simplified form as a measuring element of the device 300, although the pressure is not exclusively determined by measurement but, in particular, through calculation. Furthermore, for the purpose of influencing the air mass flows and pressure states the pressure regulator 304 is connected in a signal-conducting manner to all controllable valves 93.1, 93.2, 93.3, 93.4, 241, 250 of the pneumatic system 100. These connections are not depicted in the present case for reasons of clarity. A device of this kind may be created by an Electronic Control Unit (ECU), for example.

Furthermore, the compressed air supply system 10 in the present case has a pressure accumulator 120. The pressure accumulator 120 is connected to the gallery main connection 12 in a gas-conducting manner via a pressure accumulator supply line 82. This connection can be selectively interrupted via a pressure accumulator valve 250.

The compressor arrangement 21 in the present case is driven by a motor M and, for the purpose of compressing compressed air DL, draws air via the vent connection 3. An air filter 68 is arranged between the compressor arrangement 21 and the vent connection 3.

Figure 2:
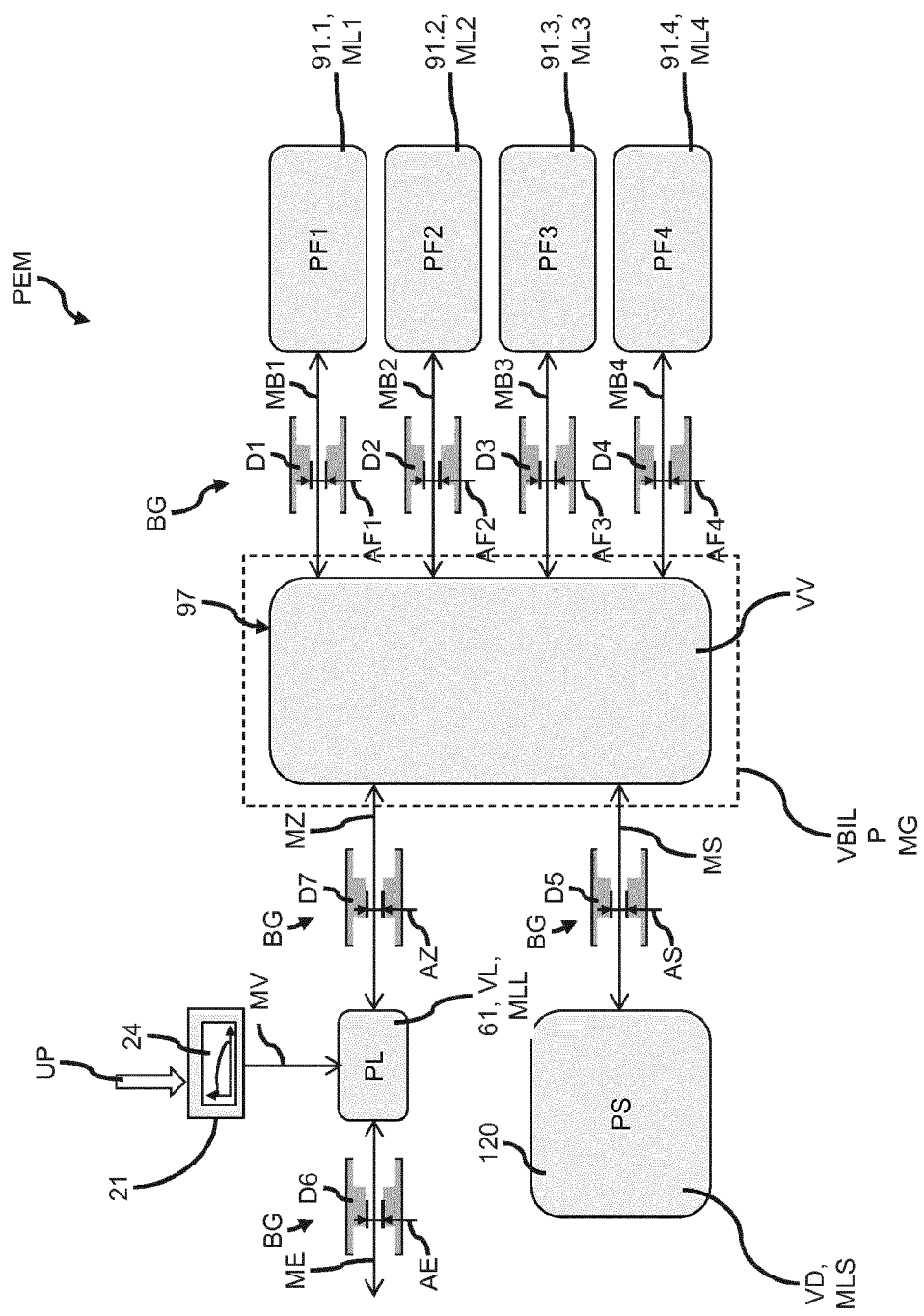
FIG. 2 shows a schematic representation of a pneumatic surrogate model.

FIG. 2 shows a schematic depiction of a pneumatic surrogate model PEM according to an embodiment. In this case, a pneumatic system such as that depicted in FIG. 1, for example, is designed in simplified form, in particular as a system of volumes and throttles, as the basis for a model for computational pressure determination.

In the present case, the valve block 97 with its valve block volume VV forms a balance volume VBIL taking account of all essential mass flows, in which balance volume a total air mass MG is located. Four spring bellows 91.1, 91.2, 91.3, 91.4 are attached to the valve block 97. The lines and valves leading to the respective spring bellows are taken account in the pneumatic surrogate model PEM in simplified form by a throttle D1, D2, D3, D4 in each case. The lines and valves leading from the valve block 97 to the pressure accumulator 120, in particular the pressure accumulator valve 250 and the pressure accumulator supply line 82, are taken into account by the throttles D5. When the respective directional valve 93.1, 93.2, 93.3, 93.4 is in the open position, a bellows mass flow MB1, MB2, MB3, MB4 in each case is moved by the respective throttles D1, D2, D3, D4. Irrespective of the pressure conditions in each case, this movement takes place either from the valve block 97 to the respective spring bellows 90.1, 91.2, 91.3, 91.4, which would result in a lifting of the respective air spring, or in the reverse direction, which would result in a lowering of the respective air spring.

Analogously to the bellows mass flows MB1, MB2, MB3, MB4, when the pressure accumulator valve 250 is in the open position, an accumulator air mass flow MS moves through the throttle D5. During a filling of the pressure accumulator 120, the accumulator air mass flow MS can move from the valve block 97 to the pressure accumulator 120. Conversely, when compressed air stored in the pressure accumulator 120 is used, in particular to fill the spring bellows 91.1, 91.2, 91.3, 91.4, the movement direction of the accumulator air mass flow MS is reversed. The pressure accumulator 120 is treated as a bellows volume 91.1V, 91.2V, 91.3V, 91.4V in the calculation, wherein, however, the pressure accumulator volume VD is fixed in the case of the pressure accumulator.

Finally, the air drier 61, likewise in simplified form, is attached via a throttle D7 to the valve block 97. In this way, a supply mass flow MZ can move through the throttle D7. The air drier 61 is in turn connected to the compressor arrangement 21, so that a compressor air mass flow MV can flow into the air drier 61. Furthermore, the air drier 61 can be connected to the environment via a vent connection 3 not shown here. This connection is modelled by a throttle D6 in the pneumatic surrogate model PEM. A vent air mass flow ME can be moved through the throttle D6.

All mass flows through the throttles D1 to D7 can be described by diaphragm equations BG. The diaphragm equation BG in each case describes a mass flow through the respective throttle depending on the fluid properties, the flow diameter and the pressure conditions on both sides of the respective throttle. In this case, a distinction is made between supercritical and subcritical flows.

In the case of a supercritical flow, the counter-pressure prevailing on the other side of the throttle—presented in simplified form—is neglected, since it lies below the critical value.

The mass flow in this case is calculated as follows:

$$\dot{m} = A_{eff} \cdot \left(\frac{2}{\kappa+1}\right)^{\frac{\kappa}{\kappa-1}} \cdot \sqrt{\frac{\kappa}{\kappa+1}} \cdot \sqrt{2 \cdot p_i \cdot \rho_i}$$

In the case of a subcritical flow, on the other hand, the counter-pressure is taken into account when calculating the mass flow, namely in the form:

$$\dot{m} = A_{eff} \cdot \left(\frac{2}{\kappa+1}\right)^{\frac{\kappa}{\kappa-1}} \cdot \sqrt{\frac{\kappa}{\kappa+1} \cdot \left(\frac{p_a}{p_i}\right)^{\frac{1}{\kappa}} \cdot \left(\left(\frac{p_a}{p_i}\right)^{\frac{1}{\kappa}} - \left(\frac{p_a}{p_i}\right)\right)} \cdot \sqrt{2 \cdot p_i \cdot \rho_i}$$

In this case, $p_i$ describes the input pressure of the throttle and $p_a$ the output or counter-pressure $\rho_i$ and $\rho_a$ corresponding to the input and output density, $\kappa$ the isentropic exponent, and $A_{act}$ the actual flow diameter of the diaphragm or throttle. By means of these equations and the simplification performed of the respective lines through throttles D1 to D7, in the presence of the respective pressures, in particular, the missing variables, in particular the mass flows, can therefore be determined through the respective throttles D1 to D7. In particular, in this way the mass flows into, and from, the valve block 97 can be determined, in order to determine the total air mass MG and, in particular, further based on the mass flow balance BIL, to determine the individual air masses ML1, ML2, ML3, ML4, MLS, MLL.

Pressures PF1, PF2, PF3, PF4 of the spring bellows 91.1 to 91.4 are, in particular, dependent on the deflections 92.1A, 92.2A, 92.3A, 92.4A of the associated air spring 92.1, 92.2, 92.3, 92.4 in each case and of the instantaneous load state and can be approximately determined, for example, in that the current height, i.e. the deflection of the respective air spring, is measured. The deflection is determined, in particular, via a level sensor H.1, H.2, H.3, H.4 on the respective spring bellows 91.1, 91.2, 91.3, 91.4 and/or the respective axle. Where necessary, with this approximate determination further parameters, in particular the temperature measured in, or proximate to, the respective volume can be taken into account in the calculation for the purpose of correction.

Furthermore, a volume flow delivered by the compressor arrangement 21 can be determined as a function of the pressure with the help of a delivery flow characteristic curve 24. In this way, the compressor air mass flow MV can be determined at least approximately.

The delivery flow characteristic curve 24 of a compressor depends on external factors, namely environmental parameters UP. These may be partially taken into account by existing sensors in the vehicle (e.g. ambient pressure sensor of the air conditioning system). The tolerances of the compressor which result due to mechanical production tolerances or wear, for example, could be corrected by self-calibration when filling up a known volume (e.g. when filling up the pressure accumulator 120 or the air drier 61). The accuracy of the pressure calculations could thereby be significantly improved.

Furthermore, the balance volume VBIL of all components taken into account in the pneumatic surrogate model can be described. In the present case, the balance volume VBIL is created by the volume of the valve block 97. By creating a mass flow balance BIL, all air mass flows MB1, MB2, MB3, MB4, MS, MZ entering the balance volume VBIL and leaving the balance volume VBIL can be determined.

In the case of the individual volumes, a distinction is made between unchangeable volumes—in particular the pressure accumulator volume VD and the air drier volume VL—and changeable volumes—in particular the bellows volumes 91.1V, 91.2V, 91.3V, 91.4V. In this case, the volumes 91.1V, 91.2V, 91.3V, 91.4V of the spring bellows 91.1, 91.2, 91.3, 91.4 are substantially dependent on the deflections 92.1A, 92.2A, 92.3A, 92.4A of the associated air spring 92.1, 92.2, 92.3, 92.4 in each case.

For various purposes, for example the availability calculation during lifting from a pressure accumulator, the control system of an air spring system requires the pressures in the air spring bellows and in the pressure accumulator. In particular, the pressures in the air spring bellows are primarily dependent on the static wheel load (vehicle unladen weight+variable vehicle load) and the contour of the spring bellows.

Since the deflections 92.1A, 92.2A, 92.3A, 92.4A can be measured by means of sensors frequently already present in the vehicle, in particular level sensors, the information needed in order to calculate the mass flow balance BIL is therefore available.

The pressure prevailing in the balance volume can be calculated with the balance volume VBIL based on the total air mass MG by means of a gas equation (GG), in particular an ideal gas equation (IGG). The pressure prevailing in the individual volume can be similarly calculated for an individual volume 91.1V, 91.2V, 91.3V, 91.4V, VD, VL based on an individual air mass ML1, ML2, ML3, ML4, MLS, MLL assigned to the individual volume. The following applies in general:

$$P = \frac{M * R * T}{V}$$

In this case, V denotes the volume, M the air mass, T the temperature measured or assumed in the volume V, and R the gas constant.

Figure 3:
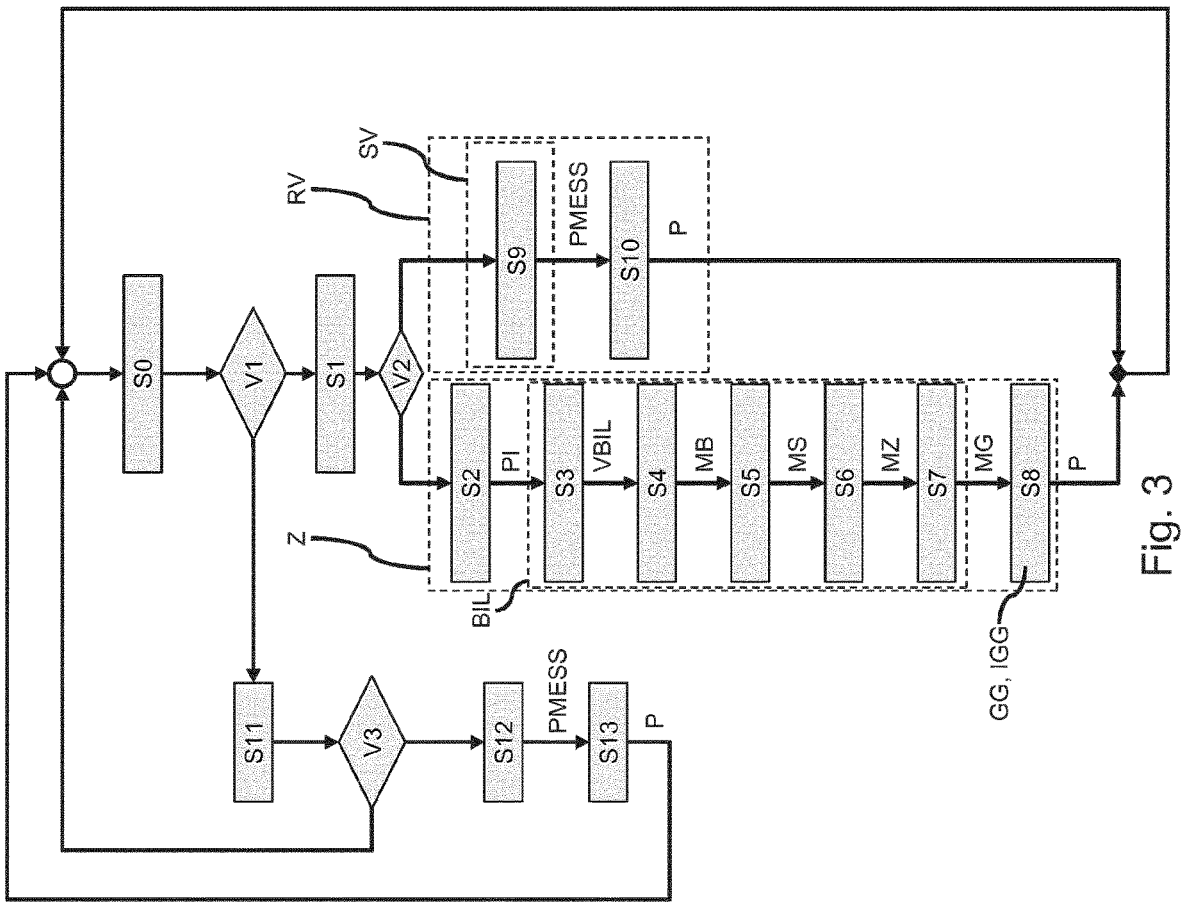
FIG. 3 shows a schematic flow chart for determining a pressure value by means of the pneumatic surrogate model.

FIG. 3 describes schematically a possible sequence, in particular for pressure determination, by means of the pneumatic surrogate model.

In a step S0, a continuous check is initially made as to whether a change of state ZA of the pneumatic system 100 is taking place. A change in state ZA may, in particular, lie in a change in vehicle height, in other words the change of at least one deflection 92A, 92.1A, 92.2A, 92.3A, 92.4A, or another switching operation SV, for example an opening of the vent valve 250. If a change in state ZA occurs, the implementation of step S1 continues via a branch V1 for the purpose of determining a new pressure value P, PL, PV, PS, PE, PF1, PF2, PF3, PF4.

In step S1 a check is made as to whether the change in state ZA is a switching operation SV in which—particularly within the framework of a control operation—a pressure PMESS is measured. This may be the case, for example, when the vehicle is lifted by the compressor 21, in particular, or the pressure accumulator 120 is filled by the compressor 21.

If this is not the case, the program sequence continues via a branch V2 to step S2 for the purpose of the computational determination of the pressure P—in an application cycle Z, in which the pneumatic surrogate model PEM is applied.

A first fixing of an initial pressure PI takes place in step S2. This may, in particular, happen via a value P calculated in a previous implementation of the method or application of the pneumatic surrogate model PEM or via a value PMESS measured by a pressure sensor 94.

In the subsequent steps S3-S7, the creation of a mass flow balance BIL for a balance volume VBIL takes place. Determination of a balance volume VBIL takes place in step S3. In the present case, the balance volume is created by the valve block volume VV of the valve block 97, in particular because all mass flows relevant to the pressure determination, in particular the mass flows MB, MB1, MB2, MB3, MB4, MS, MZ, go through the valve block 97.

In step S4, a determination of at least one bellows air mass flow MB, MB1, MB2, MB3, MB4 takes place by means of a diaphragm equation BG, taking account of at least one spring bellows pressure PF, PF1, PF2, PF3, PF4 and at least one actual spring bellows flow cross section AF, AF1, AF2, AF3, AF4. In this case, the pressures PF1, PF2, PF3, PF4 of the spring bellows 91.1 to 91.4 are dependent on the deflections 92.1A, 92.2A, 92.3A, 92.4A of the associated air spring 92.1, 92.2, 92.3, 92.4 in each case and the instantaneous load state and can be approximately determined if, during a lowering of the respective air spring, the current height, in particular the deflection of the air spring, is measured.

Analogously to this, the determination of at least one accumulator air mass flow MS by means of a diaphragm equation takes place in step S5, taking account of at least one accumulator pressure PS and at least one actual accumulator flow cross section AS.

Furthermore, determination of a supply air mass flow MZ by means of a diaphragm equation BG takes place in a step S6, taking into account at least one air drier pressure PL and at least one actual supply flow cross section AZ. As already depicted in FIG. 2, in this case the air drier pressure PL is furthermore dependent on the compressor air mass flow MV and the vent air mass flow ME. The air drier has a constant air drier volume VL. The condenser air mass flow MV in this case results particularly from a delivery flow characteristic curve of the compressor. The vent air mass flow ME can likewise be determined by a diaphragm equation, taking account of the throttle D6 with an actual vent flow cross section AE, and also the vent pressure PE. In particular, in order to determine the supply air mass flow MZ, a further mass flow balance BIL' is created for the air drier volume VL of the air drier 61.

It should be noted in connection with steps S4, S5 and S6 that all air mass flows need not always necessarily be determined or they may be equal to zero when determining individual or multiple air mass flows. In particular, it is even reasonable and preferable for only individual air mass flows to be determined, namely at the respective point in time at which a corresponding valve is actuated to trigger that, in particular individual, air mass flow.

Following determination of the air mass flow or the air mass flows, in a subsequent step S6 there is a balancing of the air mass flows, in particular of the air mass flows MB, MB1, MB2, MB3, MB4, MS, MZ for calculation of a total air mass MG.

Following the balancing in step S7, the necessary information is available in order to recalculate the pressure P, PL, PV, PS, PE, PF1, PF2, PF3, PF4 in a second determination in step S8. For this purpose, for example, the pressure P is calculated based on a gas equation (GG), in particular an ideal gas equation (IGG), taking account of the total air mass MG of the balance volume VBIL of a particularly measured temperature T.

An individual pressure value PL, PV, PS, PE, PF1, PF2, PF3, PF4 can also be calculated. In order to determine an individual pressure value PL, PV, PS, PE, PF1, PF2, PF3, PF4 of an individual volume 91V, 91.1V, 91.2V, 91.3V, 91.4V, VD, VL, the mass flow balance BIL is likewise taken as the basis. Based on an air mass flow MB, MB1, MB2, MB3, MB4, MS, MZ calculated by means of the mass flow balance BIL which is assigned to this individual volume 91V, 91.1V, 91.2V, 91.3V, 91.4V, VD, VL, the change in pressure PL, PV, PS, PE, PF1, PF2, PF3, PF4 caused by the individual air mass flow MB, MB1, MB2, MB3, MB4, MS, MZ can be calculated. Through an air mass flow MB, MB1, MB2, MB3, MB4, MS, MZ into, or from, an individual volume 91V, 91.1V, 91.2V, 91.3V, 91.4V, VD, VL, the respective individual air mass ML1, ML2, ML3, ML4, MLS, MLL in this individual volume 91V, 91.1V, 91.2V, 91.3V, 91.4V, VD, VL has changed and therefore also the pressure PL, PV, PS, PE, PF1, PF2, PF3, PF4 in this volume.

For example, for the accumulator volume VD the pressure change in the pressure accumulator 120, and therefore the accumulator pressure PS, can be determined by means of the accumulator air mass flow MS determined by the mass flow balance BIL—and the pressure accumulator individual air mass MLS therefore present in the pressure accumulator 120. The associated spring bellows pressure PF1, PF2, PF3, PF4 in each case can be calculated for the changeable bellows volumes 91.1V, 91.2V, 91.3V, 91.4V too—by means of the additional information on the deflection 92A, 92.1A, 92.2A, 92.3A, 92.4A—by analogy with the corresponding bellows mass flow MB1, MB2, MB3, MB4—and the bellows individual air masses ML1, ML2, ML3, ML4 resulting from this.

If it is ascertained in step S1 that a switching operation SV is involved during which a pressure PMESS is measured, this measured pressure is determined in step S9. For this purpose, the measured pressure value, which is particularly measured as part of a control operation RV, is particularly read via a control system of the pneumatic system not depicted in greater detail here. In step S10 there is then a balancing of the measured value PMESS and—particularly in a preceding cycle in steps S2 to S8—the calculated value P and, in particular, a correction of the calculated value P based on the measured value PMESS. In this way, a value PMESS advantageously measured primarily for a different purpose, in particular a control operation, can be used for the correction of the computationally determined value P, and the accuracy of the method is thereby improved. Through a corresponding addition of an individual volume 91V, 91.1V, 91.2V, 91.3V, 91.4V, VD, VL on the pressure sensor 94, a calculated individual pressure PL, PV, PS, PE, PF1, PF2, PF3, PF4 can be similarly corrected. For example, in that the first bellows valve 93.1 is opened individually and therefore switched to the pressure sensor 94, a corresponding pressure PMESS can be measured for the first spring bellows 92.1, with which a calculated individual pressure PF1 can be corrected.

If it is ascertained in step S0 that no switching operation of the pneumatic system 100 takes place and consequently there is sufficient free time TFREI available for a measurement, the program sequence is conducted via the branch V1 in such a manner that step S11 is carried out. In step S11 a check is made to determine whether the current operating state of the vehicle allows a compressed air measurement. If, in particular, it is to be expected that the compressed air supply for level control of the vehicle will have to be available within a sufficiently short period of time, a compressed air measurement is dispensed with and the program sequence is returned via the branch V3 to the starting point and therefore to step S0. However, if a compressed air measurement is a possibility according to the aforementioned criteria, said compressed air measurement is carried out in a step S12, in particular by the compressed air sensor 94. In a subsequent step S13, there then takes place—similarly to step S10—a balancing of the measured value PMESS and the calculated value P—particularly calculated in the preceding cycle—and, in particular, a correction of the calculated value P based on the measured value PMESS. Following step S13, the program sequence is returned to the starting point and therefore to step S0.

During operation, in other words during the operation of the pneumatic system (100), in particular during the operation of a vehicle (1000) having a pneumatic system (100), a change in state (ZA) of this kind can take place comparatively frequently, in particular even when there are small load changes, temperature fluctuations or dynamic forces resulting from operation which have a particular influence on the vehicle level, in other words the deflection 92A, 92.1A, 92.2A, 92.3A, 92.4A. Consequently, a continuous or quasi-continuous computational determination of the air pressure can take place, in particular because the time needed to carry out the calculation of the pressure P based on the pneumatic surrogate model PEM is comparatively small compared with determining the pressure PMESS by measurement.

Figure 4:
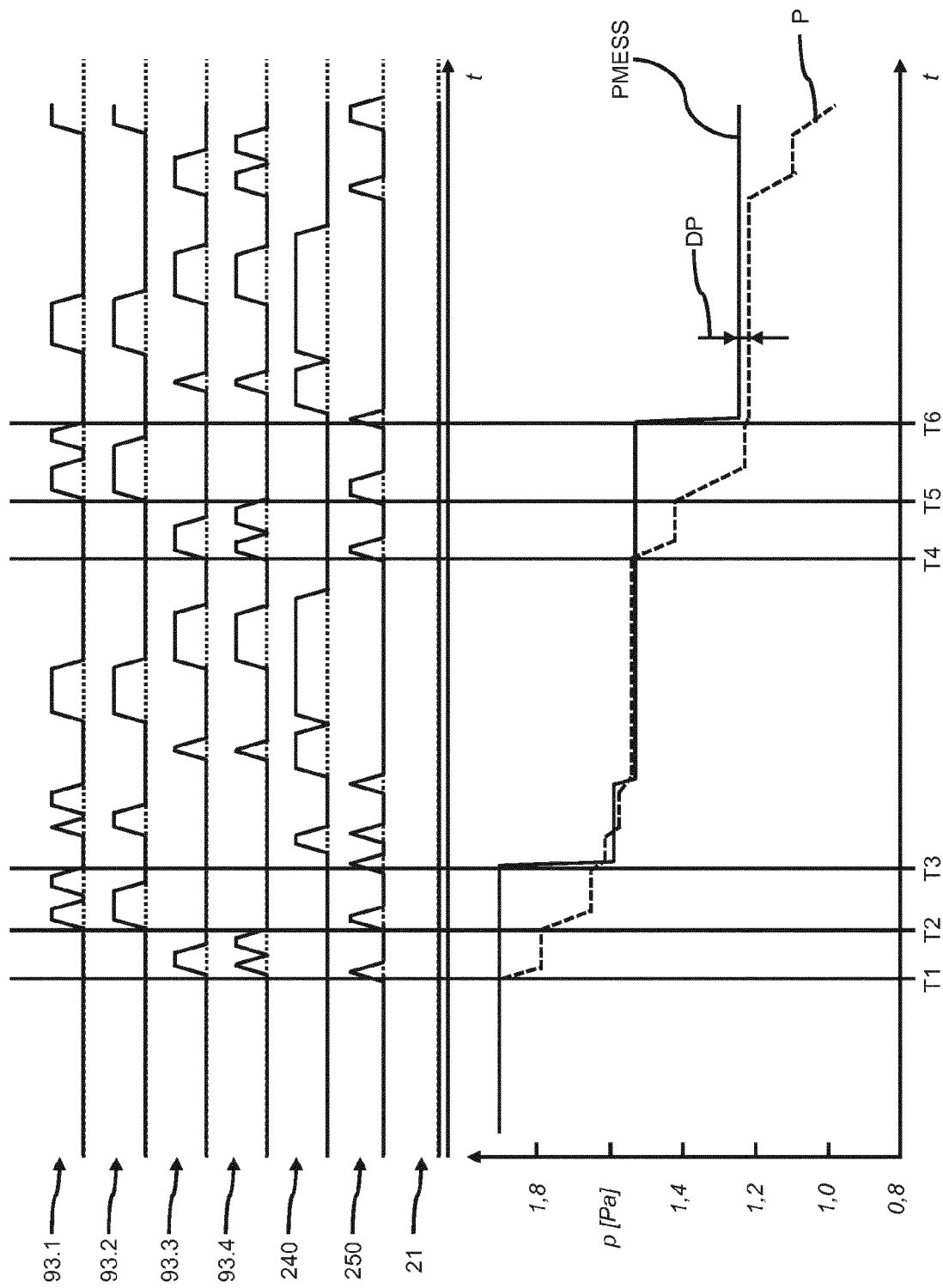
FIG. 4 shows a time curve of switching states of a pneumatic system and measured and calculated pressure.

FIG. 4 shows a time curve of switching states of a pneumatic system 100 and measured pressure MESS and also calculated pressure P.

The lower part of the diagram shows a pressure time curve in Pascal in the pressure accumulator 120, wherein on the one hand the actual measured pressure value PMESS and the calculated pressure value P is depicted.

In the example, the pressure accumulator valve 250 along with the valves 93.3, 93.4 of the rear axle 932 is initially actuated at time T1. Since the pressure level in the pressure accumulator 120 is higher than in the bellows 91.3, 91.4 (the bellows pressures are not shown in this case), air flows from the pressure accumulator 120 into the bellows 91.3, 91.4. Consequently, the vehicle is lifted on the rear axle 932 and the pressure in the pressure accumulator 120 drops.

After the rear axle 932 has been lifted, a lifting of the front axle 930 takes place at time T2. In this case, the pressure accumulator valve 250 is again actuated with the bellows valves 93.1, 93.2.

As it is not possible in the present case to measure the pressure in the pressure accumulator 120 during lifting, a subsequent additional pressure measurement at time T3 is required.

At times T4, T5 and T6 the steps of times T1, T2 and T3 are repeated analogously. At time T4 the rear axle 932 is lifted by the actuation of the valves 93.3, 93.4. At time T5 the front axle 930 is lifted by the actuation of the valves 93.1, 93.2. There then follows a pressure measurement to determine the measured pressure PMESS at a time T6.

It should be noted that the measured pressure value PMESS is only updated during the pressure measurement (T3, T6) in each case. The calculated pressure value, on the other hand, is continually updated (profile of the dotted line at T1 and T2 and also T4 and T5).

The small pressure difference DP between the measurement PMESS and the calculation P following the actual pressure measurement shows that with the calculation method described herein, a subsequent correcting measurement could even be dispensed with entirely.

Figure 5:
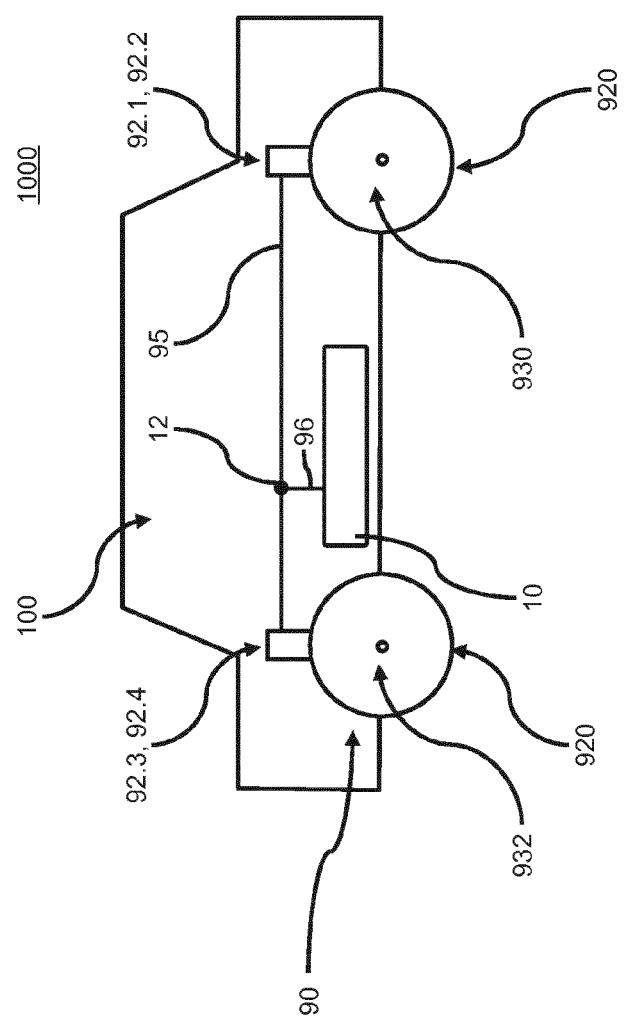
FIG. 5 shows a highly simplified representation of a vehicle with a pneumatic system.

FIG. 5 shows a schematic representation of a vehicle 1000—in the form of an automobile in the present case—comprising a pneumatic system 100 with a compressed air supply system 10 and an air spring system 90. Particularly in the case of vehicles in the automobile sector, a rapid supply of compressed air for level adjustment during operation is of great importance, since intervals, particularly for carrying out an air pressure measurement, are noticeable to the driver of the vehicle. This is why, without limiting the applicability for trucks or other commercial vehicles too, for example, the automobile 1000 represented has four wheels 920, of which in this case, due to the sectional depiction, the two front wheels in each case are shown. Analogously to the number of wheels, the air spring system 90 has four air springs 92.1, 92.2, 92.3, 92.4, of which in this case analogously to the wheels, on account of the sectional representation, the two front bellows in each case are shown. The four air springs 92.1, 92.2, 92.3, 92.4 which are each assigned to the four wheels 920 are supplied with compressed air as part of the air spring system 90 from the compressed air supply system 10. The compressed air supply system 10 is connected in a fluid-conveying manner via the supply line 96, the gallery main connection 12, and the gallery 95 to the components of the pneumatic system 90, in this case the four air springs 92.1, 92.2, 92.3, 92.4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Compressed air supply
2 Compressed air connection
3 Vent connection
10 Compressed air supply system
12 Gallery main connection
21 Compressor arrangement, compressor
24 Delivery flow characteristic curve
60 Pneumatic main line
61 Air drier
62 First throttle
63 Second throttle
68 Air filter
70 Vent line
82 Pressure accumulator supply line
90 Air spring arrangement, pneumatic system
91, 91.1, 91.2, 91.3, 91.4 Spring bellows, bellows
91V, 91.1V, 91.2V, 91.3V, 91.4V Bellows volume
92, 92.1, 92.2, 92.3, 92.4 Air spring
92A, 92.1A, 92.2A, 92.3A, 92.4A Deflection of the air spring
93, 93.1, 93.2, 93.3, 93.4 Directional valve, bellows valve
94 Pressure sensor
94L Sensor line
94C Pressure determination unit
95 Gallery
96 Supply line
97 Valve block
100 Pneumatic system
120 Pressure accumulator
120V Pressure accumulator volume
240 Vent valve
241 Control valve
250 Pressure accumulator valve
300 Device for controlling and regulating a pneumatic system
302 Control line
304 Pressure regulator
920 Wheel
930 Front axle
932 Rear axle
1000 Vehicle
M Engine
AE Actual vent flow cross section
AF Actual spring bellows flow cross section
AS Actual accumulator flow cross section
AV Actual compressor flow cross section
AZ Actual supply flow cross section
BG Diaphragm equation
BIL, BIL' Mass flow balance, further mass flow balance
D1-D7 Throttles of the pneumatic surrogate model
DL Compressed air
DP Pressure difference
GG Gas equation
GGI Ideal gas equation H.1-H.4 Level sensor
MB, MB1-MB4 Bellows mass flow
ME Vent air mass flow
MG Total air mass
ML1-4 First to fourth bellows individual air mass
MLS Pressure accumulator individual air mass
MLL Air drier individual air mass
MS Accumulator air mass flow
MV Compressor air mass flow
MZ Supply air mass flow
P Pressure, calculated pressure
PE Vent pressure
PF, PF1, PF2, PF3, PF4 Spring bellows pressure
PEM Pneumatic surrogate model
PL Air drier pressure
PMESS Measured pressure
PS Accumulator pressure
PV Compressor pressure
PU Ambient pressure
PZ Supply pressure
RV Control operation
U Environment
UK Compressor supply voltage
UP Ambient parameter
SV Switching operation
T Temperature
T1-T6 Times of switching operations
TFREI Free period of time for pressure measurement
VD Pressure accumulator volume
VL Air drier volume
VV Valve block volume
Z Application cycle of the pneumatic surrogate model

The invention claimed is:

1. A method for operating a pneumatic system having a compressed air supply system and an air spring system, the method comprising:
    determining at least one deflection of at least one air spring of the pneumatic system, wherein the air spring is configured to be connected to a gallery of the pneumatic system in a selectively gas-conveying manner via a valve in a valve block;
    determining at least one bellows volume of a spring bellows of the at least one air spring based on the at least one determined deflection;
    indicating a pneumatic surrogate model for the at least one bellows volume and/or for a pressure accumulator volume of a pressure accumulator of the pneumatic system based on a mass flow balance for a balance volume; and
    calculating, based on the pneumatic surrogate model, at least one pressure value of the at least one bellows volume, the pressure accumulator volume, and/or the balance volume.

2. The method as claimed in claim 1, wherein the at least one pressure value is calculated during a change in state of the pneumatic system,
    wherein the change in state is a change in the at least one deflection or one control operation of the air spring supply or a switching operation of at least one valve.

3. The method as claimed in claim 1, wherein the at least one pressure value is corrected by a pressure value measured by a pressure sensor.

4. The method as claimed in claim 3, wherein the measured pressure value is measured by the pressure sensor in a period of time in which no control operation of the air spring system takes place.

5. The method as claimed in claim 3, wherein the measured pressure value is measured by the pressure sensor during a control operation.

6. The method as claimed in claim 1, wherein the at least one deflection is measured by means of a level sensor.

7. The method as claimed in claim 1, wherein the pneumatic surrogate model is created by:
    determining an initial pressure prevailing in the balance volume,
    determining at least one individual initial pressure in at least one individual volume which is not part of the balance volume,
    determining all air mass flows flowing into the balance volume or flowing out of the balance volume,
    determining a total air mass located in the balance volume and/or determining at least one individual air mass located in a volume,
    calculating the pressure with an air mass, a volume and a measured temperature based on a gas equation.

8. The method as claimed in claim 7, wherein the determination of all mass air flows flowing into the balance volume or out of the balance volume involves:
    determining, through calculation, at least one bellows air mass flow by a diaphragm equation, taking account of at least one spring bellows pressure and at least one actual spring bellows flow cross section, and/or
    determining, through calculation, at least one accumulator air mass flow by a diaphragm equation, taking account of at least one accumulator pressure and at least one actual accumulator flow cross section, and/or
    determining through calculation a supply air mass flow by a diaphragm equation, taking account of at least one air drier pressure and at least one actual supply flow cross section,
    balancing a total air mass, taking account of all air mass flows.

9. The method as claimed in claim 7, wherein determining the air drier pressure further comprises:
    determining, through calculation, a compressor air mass flow by a diaphragm equation, taking account of at least one compressor pressure and at least one actual compressor flow cross section, and/or
    determining, through calculation, a vent air mass flow by a diaphragm equation, taking account of at least one vent pressure and at least one actual vent flow cross section.

10. The method as claimed in claim 7, wherein the initial pressure prevailing in the balance volume is determined based on the measured pressure determining.

11. The method as claimed in claim 7, wherein the initial pressure prevailing in the balance volume is determined based on the calculated pressure of a preceding application cycle of the pneumatic surrogate model.

12. The method as claimed in claim 7, wherein the compressor pressure and/or the compressor air mass flow is determined by a delivery flow characteristic curve.

13. The method as claimed in claim 12, wherein the delivery flow characteristic curve is adapted depending on environmental parameters and/or a compressor supply voltage.

14. The method as claimed in claim 9, wherein the vent pressure is provided by atmospheric ambient pressure.

15. The method as claimed in claim 1, wherein the compressed air is generated by a compressor if the determined pressure or the measured pressure lies below a minimum pressure value.

16. The method as claimed in claim 1, wherein compressed air is released via a vent connection if the determined pressure or the measured pressure lies above a maximum pressure value.

17. A device for the control and regulation of a pneumatic system, wherein the device is configured to implement the method as claimed in claim 1 and has a pressure determination unit and a pressure regulator.

18. A pneumatic system comprising:
a compressed air supply system;
an air spring system;
a pressure accumulator;
a gallery and at least one air spring configured to be connected to the gallery via a valve of a valve block in a selectively gas-conveying manner; and
a device configured to perform the method as claimed in claim 1 for operating the pneumatic system, the device including a pressure determination unit and a pressure regulator.

19. A vehicle, having the pneumatic system as claimed in claim 18.

20. The method according to claim 1, wherein the pressure accumulator volume of the pressure accumulator of the pneumatic system is an air drier volume of an air drier of the pneumatic system.

\* \* \* \* \*